United States Patent [19]

Lundsager

[11] Patent Number: 4,722,819
[45] Date of Patent: Feb. 2, 1988

[54] DIE AND PROCESSES FOR MANUFACTURING HONEYCOMB STRUCTURES

[75] Inventor: Christian B. Lundsager, Ashton, Md.

[73] Assignee: W. R. Grace & Co., New York, N.Y.

[21] Appl. No.: 856,743

[22] Filed: Apr. 28, 1986

[51] Int. Cl.⁴ ............................................... B29B 11/10
[52] U.S. Cl. .................... 264/177.11; 29/558;
29/DIG. 26; 264/177.12; 264/177.19;
264/209.1; 264/209.8; 425/382 R; 425/461;
425/462; 425/467
[58] Field of Search ............ 264/209.1, 209.8, 177.11,
264/177.12, 177.19; 425/461-467, 382; 29/558,
DIG. 26

[56] References Cited

U.S. PATENT DOCUMENTS

| | | | |
|---|---|---|---|
| 1,601,536 | 9/1926 | Laskey | 425/464 |
| 3,406,435 | 10/1968 | Dietzsch | 25/17 |
| 3,790,654 | 2/1974 | Bagley | 264/177 |
| 3,824,196 | 7/1974 | Benbow et al. | 252/455 R |
| 4,118,456 | 10/1978 | Blanding et al. | 425/464 |
| 4,168,944 | 9/1979 | Morikawa et al. | 425/464 |
| 4,235,583 | 11/1980 | Reed | 425/464 |
| 4,242,075 | 12/1980 | Higuchi et al. | 425/462 |
| 4,290,743 | 9/1981 | Suzuki | 425/464 |
| 4,298,328 | 11/1981 | Frost | 425/376 A |
| 4,354,820 | 10/1982 | Yamamoto et al. | 425/382 R |
| 4,373,895 | 2/1983 | Yamamoto et al. | 425/382 R |
| 4,384,841 | 5/1983 | Yamamoto et al. | 425/461 |
| 4,550,005 | 10/1985 | Kato | 425/461 |

Primary Examiner—Jeffery Thurlow
Attorney, Agent, or Firm—Cabic Edward J.

[57] ABSTRACT

Forming thin-wall honeycomb structures using novel extrusion die; method of making the die. The die has feed holes feeding to slots of a primary extrusion grid. A secondary grid is milled between slots of the primary grid, and successive subsequent grids can be provided between previously milled slots (secondary grid, tertiary grid, quaternary grid), and so on. Extrudable material is fed to the die under pressure; the material flows through the feed holes longitudinally to the primary grid, when the material flows to subsequent grid or grids. The material emerges from the die face as a thin-walled honeycomb structure. It is then rigidified to prevent deformation.

19 Claims, 11 Drawing Figures

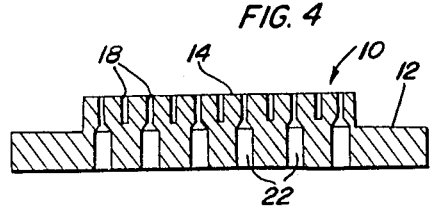
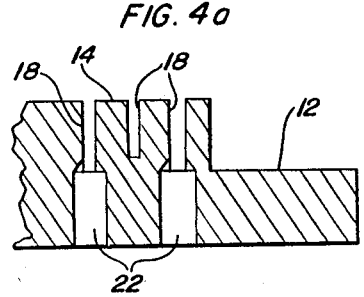
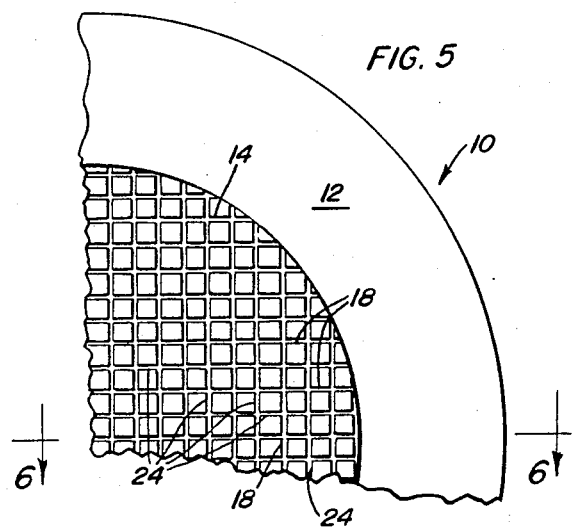
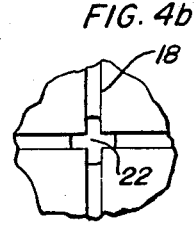
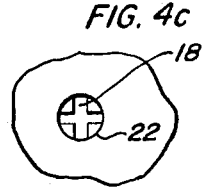
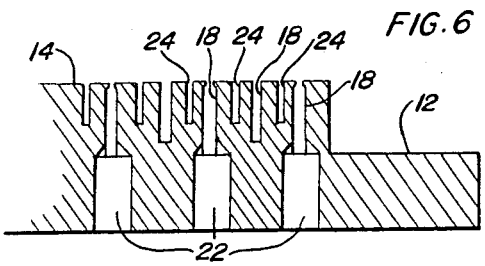
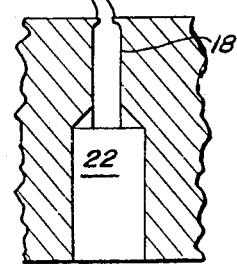

DIE AND PROCESSES FOR MANUFACTURING HONEYCOMB STRUCTURES

BACKGROUND OF THE INVENTION

This invention pertains to the art of manufacturing thin-walled honeycomb structures from extrudable material such as ceramic pastes, molten glasses, plastics, molten metals, and similar materials which have the property of being able to flow or plastically deform during extrusion while being able to become sufficiently rigid immediately thereafter so as to maintain structural and dimensional integrity. In one aspect the present invention relates to an improved extrusion die structure and method for forming uniform thin-walled cellular or honeycomb type articles having a plurality of openings or passages extending therethrough with wall portions between such openings having a preferred thickness of between about 0.005 inches and 0.10 inches, so as to provide open frontal areas of about 75% or greater. In another aspect the present invention relates to a method for making the aforesaid die.

U.S. Pat. No. 3,790,654 shows an extrusion die made in two basic steps. First, a gridwork of discharge slots is cut into the outlet face. This operation forms core pins. Second, feed holes are drilled into the inlet face to register with alternate intersections of the gridwork. There is no secondary gridwork.

U.S. Pat. No. 1,601,536 shows two sets of grids in the die face, one for air, one for candy. Air enters the air slots from the atmosphere, and the air grid has no contact with the candy feed grid, whether within the grid or outside.

U.S. Pat. No. 3,406,435 shows spaced pins (or sleeves) attached to the face of an extrusion die. Spaces between the pins form the walls of the honeycomb. There is no secondary grid.

U.S. Pat. No. 3,824,196 shows a die with "primary" and "secondary" channels. However, "primary" refers simply to feed holes and "secondary" to a single grid. There is no second grid laid down between the slots of a first grid. The die offers basically two-step flow action, with no secondary grid such as is in the instant invention.

U.S. Pat. No. 4,298,328 discloses a masking spacer for a die perimeter, so as to minimize distortion of peripheral cells of an extruded honeycomb structure.

BRIEF DESCRIPTION OF THE DRAWINGS

FIG. 2-a is a magnified fragment of FIG. 2.

FIG. 4 is a sectional view in elevation of the die taken along the line 4-4 of FIG. 3. FIG. 4-a is a magnified fragment of FIG. 4.

FIG. 4-b shows a fragmentary plan view of an intersection of slots of primary grid 18, looking down into feed hole 22.

FIG. 4-c is a plan view of the pressure side of the same feed hole and grid intersection.

FIG. 4-d is a magnified fragmentary sectional view in elevation of one feed hole 22 exiting into slot 18, and shows electroplated lips 26.

FIG. 5 is a partial plan view of the face of the completed die of this invention.

FIG. 6 is a sectional view in elevation of the die of FIG. 5 taken along the line 6—6.

DETAILED DESCRIPTION OF THE DRAWINGS

Figure 1:
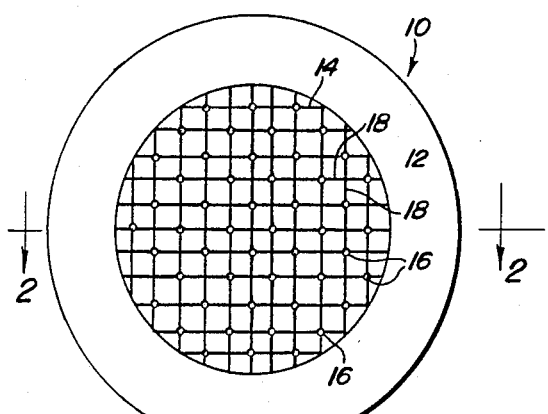
FIG. 1 is a plan view of the face of a preferred embodiment of the die of this invention, showing the primary grid and pilot drill holes. The die in this configuration is not in completed form.
Figure 2:
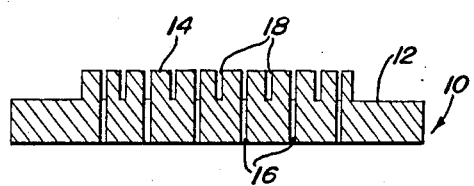
FIG. 2 is a sectional view in elevation of the die of FIG. 1 taken along the line 2-2.
Figure 2A:
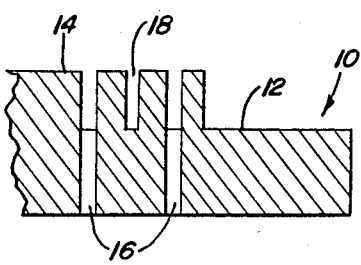

FIG. 1 shows the partially formed extrusion die. The die is shown generally at 10. 12 is a peripheral recess, designed to mate with a retaining flange holding the die to the extrusion barrel of a conventional extrusion apparatus (not shown). The extrusion face is shown at 14. In this view it will be noted that the slots 18 of the primary grid have been milled into the face 14, and pilot holes 16 have been drilled into the face at alternate, staggered intersections of the grid 18. In the preferred embodiment the diameter of the pilot holes 16 is the same as the width of the slots 18. As shown in FIG. 2, the slots of grid 18 extend down to the level of the recess 12. This is the preferred depth of the slots of the primary grid, but this depth can vary, taking into account the depth of the slots of the secondary grid 24, as hereinafter discussed (cf. FIG. 5).

Figure 3:
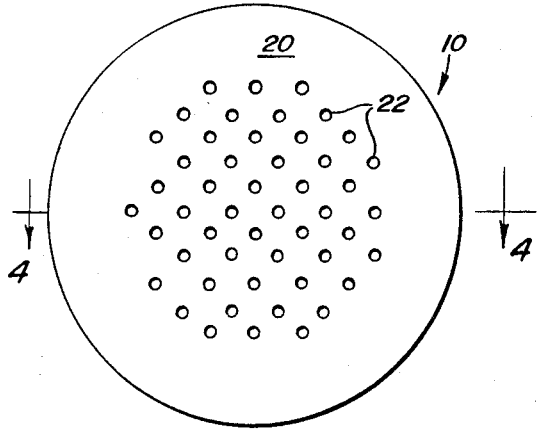
FIG. 3 is a plan view of the obverse (feed or pressure) size of the die, showing feed holes.

FIG. 3 shows the obverse (i.e., feed, or pressure) side 20 of the die after feed holes 22 have been drilled from this side so as to enlarge the pilot holes 16. These feed holes 22 contact (i.e., communicate with) the alternate interior intersections of the slots of the primary grid 18 where those intersections have already been penetrated by pilot holes 16 (see FIG. 1). This contact is seen best in FIGS. 4 and 4-a. In these two figures the width of all of the slots 18 are to be the same and they are all to extend down to the same depth.

FIG. 5 shows a preferred form of the completed die. Slots of a secondary grid 24 have been milled and centered between the slots of the primary grid 18. The secondary slots are not as deep in the die face 14 as those of primary grid 18 and do not directly contact or communicate with feed holes 22. Secondary grid 24 can receive extruder feed only from primary grid 18. In the sectional view shown in FIG. 6 all of the slots of the same number should be considered as having the same width and all of the slots 18 extend down to the same depth which is a depth lower than the depth to which the slots 24 extend.

The actual milled width of the slots of both the primary grid 18 and the secondary grid 24 may be larger internally than at the die face 14. As noted elsewhere in the description, uniformity of aperture width of both grids can be achieved by electroplating the die face 14, including all grid slots, followed by remilling to the narrower aperture dimensions.

Preparation and Operation of the Die

In this particular case a die blank is chosen to fit a conventional extruder having a 2⅝ inch internal diameter, with an annular retainer flange to hold the die. The blank is 3½ inches in diameter, ⅝ inches thick, of tool die steel. On one face to be referred to as the outlet face a peripheral recess 12, ¼ inch deep is turned, leaving a raised face 14, 2¼ inches in diameter. Slots 18 are milled into the outlet face in two perpendicular directions, five per inch, 1/32 inch wide, ¼ inch deep, symmetric on 2¼ inch diameter. Pilot holes 16 having 1/32 inch diameter are drilled from the outlet face side, through the blank and staggered at alternate slot crossings. Preferably, holes are avoided closer than 3/32 inches from the face perimeter. The result of these operations is seen in FIG. 1, a plan view looking down on the die outlet face.

Continuing, ⅛ inch holes 22 are drilled from the opposite inlet side (the pressure side), to ⅜ inches deep, and all burrs between slots and holes are cleaned. The result is seen in FIG. 3.

Next, the slotted face only (not the pressure face) is chrome-plated. In this operation the slots are not electroplated all the way down, just part way, so as to partially close the slots, to less than 0.015 inch opening. The chrome is then ground off the face, but leaving it in the slots. The slots are remilled, centered to 0.014 inch aperture width. For this operation (and the next) a diamond saw is recommended, since the cuts are at least partially in chrome.

The next step is a major aspect of the invention. In this operation, new slots 24 are milled, centered between existing slots 18, to 3/16 inch deep, 0.014 inches wide, and burrs are cleaned. The results are seen in FIGS. 5 and 6. From a simple visual inspection of the face of the die (FIG. 5) it cannot be determined which are the first milled deep slots (primary grid) 18 and which are the second milled shallow slots (secondary grid) 24, since the slot apertures are all the same width (0.014 inch in this case). This uniformity of aperture provides uniformity of wall thickness in the extruded honeycomb structure.

To operate the die, the extruder mix is forced under pressure into the longitudinal feed holes 22. These feed to the slots of the primary grid 18, which in turn feed to the die face and also to the secondary grid 24. The flow through the feed holes 22 will meet increased resistance to the flow as it enters into the slots 18 of the primary grid, and will flow towards the discharge of those slots, as well as laterally to fill not only the primary slots between the feed holes 22 but also the secondary slots, which are interconnected with the primary slots and with each other. The product emerging is a thin-walled honeycomb structure, without differentiation as to source of the mix (i.e., whether from the primary or the secondary grid).

Thus, going across, and having regard to successive grids, each secondary slot is milled between two primary slots. When there is a tertiary grid each tertiary slot is milled between a secondary slot and a primary slot and then between that secondary slot and the next primary slot. When there is a quaternary grid, the quaternary slots are milled between primary and tertiary, then between a tertiary and secondary, then between a secondary and tertiary, and finally between a tertiary and primary; after which the pattern repeats.

From the foregoing it will be evident that additional grids may be superimposed on the die face of FIG. 5, viz. a tertiary grid, centered between the slots of the previously machined grids and shallower and optionally narrower than the slots of the said grids; a quaternary grid, milled as above described, and so on. The slots of each successive grid are suitably shallower and narrower than those of the preceding grid, and material is added to the previous slots to allow remachining of those slots to a narrower aperture to match the aperture of all slots. There is no direct communication of the feeder holes with any of these secondary and subsequent grids. They are fed by flow from the deeper-seated preceding grids; i.e., primary to secondary, primary and secondary to tertiary, and so on. The primary grid 18 is fed exclusively by the feeder holes 20. If the tertiary slots are narrower, say 7 mil, the cutting of these slots is preceded by electroplating of the face and the primary and secondary slots, grinding of the face and recutting of primary and secondary slots to the same width as the tertiary.

Many forms of electroplating can be used, e.g., chrome, nickel, copper, and so on. The electroplated face is ground off in the above description to facilitate subsequent milling of the secondary slots 24. This preliminary grinding off is not absolutely essential and can be omitted if desired.

As noted, the discharge slots, which are of a predetermined size and orientation to form a desired thin-walled structure, extend inwardly from the outlet face a distance sufficient to insure the lateral filling of all outlet portions of such slots with the extrudable material delivered thereto by the feed holes and preceding grids of slots, prior to such material being discharged from the die. In order to facilitate such lateral flow of material within the discharge slots so as to provide a coherent mass of such material within the gridwork formed by the interconnected discharge slots, the discharge slots are preferably formed with a greater resistance to batch flow than that provided by the feed passageways. This insures that the batch material will flow laterally together within the depth of the discharge slots and prior to discharge therefrom so as to form a continuous mass of interconnected material prior to such discharge.

In other words, the process of making a die by the process of this invention involves a number of steps, including forming a die blank; milling a primary grid of intersecting slots into one face of the die blank, which is the extrusion face; drilling pilot holes through the die blank at staggered alternate intersections of the said grid; drilling feed holes through the pilot holes from the opposite side to contact grid intersections (this contact will be at the plane of the recess, see e.g. FIGS. 4 and 4-a); depositing plating on the extrusion face and in the slots of the primary grid so as to partially close said slots; grinding plating off the extrusion face, but leaving it in the slots of the primary grid; remilling the slots of the primary grid; and milling new slots between the slots of the primary grid so as to provide a secondary grid, said new slots being shallower than the slots of the primary grid and communicating only with the slots of the primary grid. Variations and refinements include milling subsequent (and shallower grids) between the slots of the secondary grid, e.g., tertiary, quaternary, and so on. Preferred plating is chrome.

In an alternate mode of preparing the die, the recess 12 is turned to a depth of only ⅛ inch. This leaves a die face 14⅛ inch deep. The die blank is then processed as in the above description, milling slots 18 and drill holes 22. Then, the die face 14 is coated with welding coating to a depth of ⅛ inch, the primary slots 18 are remilled to 0.014 inch, and next the secondary slots 24 are milled in, 0.014 inch wide, ⅛ inch deep. The die is then ready for use. Or, if a finer pattern is desired, a second welding layer, ⅛ inch thick or less, can be deposited on the face of the first welded layer, and the primary and secondary grids remilled through both welded layers. After that, a tertiary grid can be milled into the second welded layer, all the slots to be ⅛ inch deep, 0.007 inch wide. The primary grid communicates to both the secondary and tertiary grids, and the secondary grid communicates with the tertiary grid. The die face is remachined to remove any unevenness from the welding, either before or after the remachining of the slots. Additional grids can be formed by the same procedure.

The die of this invention may be described as a die with improvements over the prior art, to wit, a die with a feed face and an extrusion face, for the extrusion of a thin wall honeycomb structure, said die having a plurality of feed holes on the feed side communicating directly with a first slotted grid on the extrusion face, characterized in that at least one additional slotted grid is positioned in the extrusion face, said additional grid being positioned between the slots of the first grid, shallower than the slots of the first grid, and communicating exclusively with the first grid (i.e., not with the feed holes except through the first grid). Variations and refinements include the superposition of subsequent grids, viz., tertiary, quaternary, and so on.

In making honeycomb structures, linear production speeds of 2 to 100 inches per minute are aimed at commercially. The upper limits of this range may put severe stress on the die, since the narrow slot gaps offer great flow resistance. Higher production rates can be achieved by increasing extrusion pressures, but this in turn may rupture the die. Several opposing phenomena are at work in aiming at higher production rates (i.e., greater linear speeds of honeycomb production):

(1) thinner honeycomb walls require greater pressures.
(2) greater extrusion rates require greater pressures.
(3) greater pressures tend to rupture the die.
(4) strengthening the die internally to prevent rupture is generally at the expense of internal flow rate, i.e., increases internal resistance, requiring still greater pressures, and therefore tends to be self-defeating.

The instant invention provides a die design which ameliorates the above problems. As compared to dies of the prior art, and under conditions otherwise comparable, this invention permits lower pressures for a given extrusion rate; a faster extrusion rate for a given extrusion pressure; and honeycombs with thinner walls. The invention does this by an improvement in die design, as herein explained.

The invention die provides much more internal support than dies of the prior art, and is stronger than prior art dies by reason of this internal support. The support and strength is provided without unreasonable reduction of flow, and it is able to do this because of the novel die design. As to this design, one of the improvements has been to provide bigger but fewer feed holes. This makes for faster flow (less pressure) for the same cross-sectional volume. Approximately the same amount of metal is removed from the die as in prior art dies, but the resulting internal configuration is greatly different. As the feed holes contact the primary grid, and these latter contact the subsequent grid or grids, this condition of greater flow channels continues, cross-section by cross-section, as one examines the die longitudinally, proceeding from the feed side toward the extrusion face 14. And yet at the extrusion face, the plural grids (18, 24, etc.) provide the same volume of extruded honeycomb at lower pressures, and more volume in terms of higher linear speed at higher pressures, compared with prior art dies.

The die of this invention is particularly suitable in extruding ceramic mixes, such as the one described in U.S. Pat. No. 3,790,654, i.e., one having typically the following composition:

58 parts by weight of pulverized EPK Florida Kaolin, obtainable from Whittaker, Clark and Daniels of New York, N.Y.; about 20 parts by weight of Texas white talc #2619, obtainable from Hammel & Gillespie, Inc. of White Plainfield, N.J.; about 22 parts by weight of T-61 alumina produced by Aluminum Corp. of America, and about 28 parts by weight of water. Suitable bonding and plasticizing aids are included, such as methyl cellulose.

The above mix is suitably fed to the die of this invention at a pressure of 400 psi and at an extrusion rate of about 60 inches per minute. In operation, the mix flows through the feed holes 22, thence into the slots of the primary gridwork 18, thence into the slots of the secondary gridwork 24. The mix is extruded as a honeycomb structure from the aggregate of grids 18 and 24. The resulting structure has 100 openings per square inch, with wall members therebetween of about 0.014 inches, thus producing an open frontal area of about 75%. The honeycomb structure rigidifies by drying, after which it is fired, and the walls are then found to be even thinner.

In other words, the method of forming a honeycomb structure in accord with this invention comprises flowing an extrudable material longitudinally through a plurality of feed passageways, delivering such flow of material from said feed passageways directly to intersecting portions of a primary grid of interconnected discharge slots having exit apertures of substantially uniform width, delivering a portion of the flow in the primary grid laterally to a secondary grid of interconnected discharge slots having exit apertures of substantially the same width as those of the primary grid, the slots of the secondary grid receiving extrudable material only from the slots of the primary grid, and longitudinally discharging said material from the aggregate of said slots to form a continuous thin walled honeycomb mass. Variations and refinements include one or more additional grids (e.g., tertiary, quaternary, and so on), and rigidifying the extruded honeycomb structure, e.g., by drying, firing, etc.

The method of making a honeycomb structure in accordance with this invention may also be defined and described as an improvement over prior art methods, to wit, in the method of forming a honeycomb structure from an extrudable material comprising flowing an extrudable material longitudinally through a plurality of feed passageways, delivering such flow of material from said feed passageways directly to intersecting portions of a primary grid of interconnected discharge slots having exit apertures of substantially uniform width, longitudinally discharging said material to form a continuous thin-walled honeycomb mass and rigidifying said mass to provide a rigid structure having a plurality of passages extending therethrough separated by thin walls, the improvement comprising delivering a portion of the flow of material from the primary grid to a secondary grid of interconnected discharge slots having exit apertures of substantially the same width as those of the primary grid; the slots of the secondary grid receiving extrudable material from the slots of the primary grid.

Variations

The die as shown in the figures is circular and is designed to fit conventional extruders, with suitable retainer cups and/or rings. However, the die face 14 may be made substantially any shape: elliptical, polygonal, etc., while still utilizing the features of the invention.

Specific feed hole sizes and grid widths and depths are given in the description. These dimensions are subject to considerable variation, while still working within the invention, as will be obvious to those skilled in the art.

As disclosed, milling of the slots of grids 18 and 24 is done with a saw. This is a conventional machining operation. The slots can also be cut by other routing machine shop procedures, including electric discharge machining and chemical machining. If desired, the slots may be prepared in various subsurface contours, e.g., they may be undercut, typically by electrical discharge machining; or a similar effect may be obtained by conventional machining methods well known to those skilled in the art.

Pressures on the die feed face can range between the lowest pressure that will function to push mix through the die, up to the highest pressure the die will take without rupture. A suitable working pressure range is 500 to 5000 psi.

Cellular or honeycomb structures refer to any structure having a plurality of openings or passages of any desired size or shape extending therethrough. Thin walls refers to the walls between such openings or passages, having a thickness of between about 0.005 inches and 0.100 inches.

The discharge slots (primary, secondary, etc. grids) may either be uniformly spaced apart or formed with variable spacing therebetween if desired, and the gridwork formed in the outlet face by such slots may be of virtually any geometric pattern such as square, rectangular, triangular, hexagonal, circular, and even a mix of these.

Although the feed holes 22 are shown as uniformly drilled within the die body to intersect with selected areas of the slots of the primary grid 18, the diameters of the various feed holes may be varied in selected areas to provide greater or less feed as may be necessary due to the particular configuration of the extruded cellular honeycomb article. Also, although in the drawings the feed holes 22 are shown to meet intersections of the primary grid 18, actually they can be drilled to contact the slots intermediate the intersections.

Further, although the invention is primarily useful in overcoming the problems of forming thin-walled honeycomb structures having from about 100 to 1000 openings per square inch on cross sectional area, it should be appreciated that the invention may also be used in making thick walled honeycomb structures.

By "communicating" is meant the direct incoming flow of the extrudate from one die orifice, channel, or slot to the next. All grid slots on the die face of course exit out of the face into the air and/or the collection chamber, but do not "communicate" with that chamber in the sense of receiving extrudate therefrom.

It is understood that the foregoing detailed description is given merely by way of illustration and that many variations may be made therein without departing from the spirit of this invention.

What is claimed is:

1. A die with a feed face and an extrusion face, for the extrusion of a thin wall honeycomb structure, said die having a plurality of feed holes on the feed side communicating directly with a first slotted grid on the extrusion face,
   characterized in that at least one additional slotted grid is positioned in the extrusion face, said additional grid being
   (a) positioned between the slots of the first grid
   (b) shallower than the slots of the first grid and
   (c) communicating exclusively with the first grid.

2. Die in accordance with claim 1, being a die with a feed face and an extrusion face, for the extrusion of a thin wall honeycomb structure, said die having a plurality of feed holes on the feed side communicating directly with a primary slotted grid on the extrusion face,
   characterized in that a secondary slotted grid is positioned in the extrusion face, said secondary grid being
   (a) positioned between the slots of the primary grid
   (b) shallower than the slots of the primary grid and
   (c) communicating exclusively with the primary grid.

3. Die in accordance with claim 2, wherein a tertiary slotted grid is positioned in the extrusion face, said tertiary grid being
   (a) positioned between the slots of the primary and secondary grids
   (b) shallower than the slots of the secondary grid and
   (c) communicating with the primary grid and the secondary grid.

4. Die in accordance with claim 3, wherein at least one additional slotted grid is positioned in the extrusion face, said additional grid or grids being
   (a) positioned between the slots of the preceding grids
   (b) shallower than the slots of the preceding shallowest grid and
   (c) communicating with all preceding grids.

5. Die according to claim 1, in which the die is circular.

6. Die according to claim 5, in which the die has a peripheral recess, the slots of the first (primary) grid are positioned through the die face to the plane of the recess, and contact the feed holes at that plane.

7. Die according to claim 1, in which the opening of the slots of the grids are coated with a deposited metal.

8. Die according to claim 7, wherein the metal is chrome.

9. Method of forming a honeycomb structure from an extrudable material which comprises the steps
   (a) flowing an extrudable material longitudinally through a plurality of feed passageways
   (b) delivering such flow of material from said feed passageways directly to portions of a primary grid of interconnected discharge slots having exit apertures of substantially uniform width.
   (c) delivering a portion of the flow of the primary grid to a secondary grid of interconnected discharge slots having exit apertures of substantially the same width as those of the primary grid, the slots of the secondary grid receiving extrudable material only from the slots of the primary grid, and
   (d) longitudinally discharging said material from the aggregate of said slots to form a continuous thin walled honeycomb mass.

10. Method according to claim 9 in which the feed passageways in step (a) are circular in cross-section.

11. Method according to claim 9 in which at least a portion of the flow from the primary and secondary grids in step (c) is delivered to at least one additional grid, whereby said additional grid receives extrudable material from the slots of the primary and secondary grids.

12. Method according to claim 9 wherein following discharge in step (d), the extruded honeycomb mass is rigidified to provide a rigid structure having a plurality of passages extending therethrough separated by thin walls.

13. In the method of forming a honeycomb structure from an extrudable material comprising flowing an extrudable material longitudinally through a plurality of feed passageways, delivering such flow of material from said feed passageways directly to intersecting portions of a primary grid of interconnected discharge slots having exit apertures of substantially uniform width, longitudinally discharging said material to form a continuous thin-walled honeycomb mass and rigidifying said mass to provide a rigid structure having a plurality of passages extending therethrough separated by thin walls the improvement comprising delivering a portion of the flow of material from the primary grid to a secondary grid of interconnected discharge slots having exit apertures of substantially the same width as those of the primary grid; the slots of the secondary grid receiving extrudable material only from the slots of the primary grid.

14. The method according to claim 13 in which a portion of the flow of material from the secondary grid is delivered to at least one additional grid of interconnected discharge slots having exit apertures of substantially the same width of those of the primary and secondary grids.

15. Method of making a die for the extrusion of thin-wall honeycomb structures, comprising the steps,
(a) forming a die blank;
(b) milling a primary grid of intersecting slots into one face of the die blank, said face to be the extrusion face;
(c) drilling pilot holes through the die blank to communicate with slots of the said grid;
(d) drilling feed holes through the pilot holes from the opposite side to contact the grid intersections;
(e) depositing metal on the extrusion face and in the slots of the primary grid so as to at least partially close said slots;
(f) re-milling the slots of the primary grid to a narrower dimension; and
(g) milling new slots between the slots of the primary grid so as to provide a secondary grid, said new slots being shallower than the slots of the primary grid and of substantially the same width and communicating only with the slots of the primary grid.

16. Method according to claim 15, comprising the further step
(h) milling at least one additional set of slots into the die face, said additional set of slots (herein referenced as tertiary grid) being shallower than the slots of the preceding secondary grid in step (g) and communicating with the slots of all preceding grids.

17. Method according to claim 16, in which, following step (h) which produced the tertiary grid, new slots are milled between the slots of the primary, secondary and tertiary grids, said new slots (herein referenced as quaternary grid) being shallower than the slots of the tertiary grid, and communicating with the slots of the primary, secondary and tertiary grids.

18. Method according to claim 15, in which the metal deposition is chrome plating.

19. Method according to claim 15, in which the extrusion face of the die is ground to flatness following at least the final deposition of metal.

* * * * *